(12) United States Patent
Mizusaki et al.

(10) Patent No.: US 7,872,064 B2
(45) Date of Patent: Jan. 18, 2011

(54) PROTECTIVE COATING CONTAINING ACETYLENE COMPOUND

(75) Inventors: Toru Mizusaki, Echizen (JP); Norio Nakamura, Echizen (JP); Shuichiro Shinohara, Echizen (JP)

(73) Assignee: Nissin Chemical Industry Co., Ltd., Echizen-Shi (JP)

( * ) Notice: Subject to any disclaimer, the term of this patent is extended or adjusted under 35 U.S.C. 154(b) by 437 days.

(21) Appl. No.: 11/898,072

(22) Filed: Sep. 7, 2007

(65) Prior Publication Data

US 2008/0064816 A1    Mar. 13, 2008

(30) Foreign Application Priority Data

Sep. 8, 2006    (JP) .............................. 2006-243783

(51) Int. Cl.
*C08K 5/06*    (2006.01)
(52) U.S. Cl. ...................... 524/377; 524/439; 524/440; 524/441; 524/442
(58) Field of Classification Search ................ 524/377, 524/439, 440, 441, 442
See application file for complete search history.

(56) References Cited

U.S. PATENT DOCUMENTS

| | | | |
|---|---|---|---|
| 3,097,188 A | | 7/1963 | Ingram et al. |
| 3,444,114 A | | 5/1969 | Downing |
| 3,464,946 A | | 9/1969 | Downing |
| 4,619,705 A | * | 10/1986 | Dixon et al. .................. 106/487 |
| 5,075,370 A | | 12/1991 | Kubitza et al. |
| 6,884,468 B1 | * | 4/2005 | Abundis et al. ............. 427/391 |
| 2003/0078307 A1 | | 4/2003 | Shinohara et al. |
| 2005/0227900 A1 | | 10/2005 | Veltman |

FOREIGN PATENT DOCUMENTS

| | | |
|---|---|---|
| JP | 63-84671 A | 4/1988 |
| JP | 5-140491 A | 6/1993 |
| JP | 8-32851 A | 2/1996 |
| JP | 9-48943 A | 2/1997 |
| JP | 2000-104015 A | 4/2000 |
| JP | 2002-129356 A | 5/2002 |
| JP | 2002-348797 A | 12/2002 |
| JP | 2004-261679 A | 9/2004 |
| JP | 2005-272619 A | 10/2005 |

OTHER PUBLICATIONS

Derwent Publications Ltd., London, GB; AN 2003-601275 XP002464711.
Derwent Publications Ltd., London, GB; AN 2005-447689 XP002464734.

* cited by examiner

*Primary Examiner*—Edward J Cain
(74) *Attorney, Agent, or Firm*—Birch, Stewart, Kolasch & Birch, LLP

(57) ABSTRACT

A protective coating is provided. This protective coating comprises a synthetic resin solid content (A); and a mixture of (B-1) acetylene glycol represented by the following general formula (1):

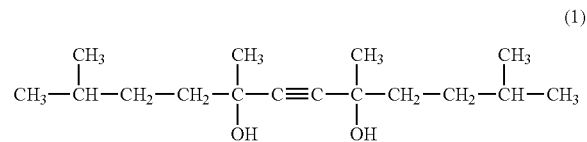

(1)

and/or an ethoxylated derivative of the acetylene glycol represented by the following general formula (2):

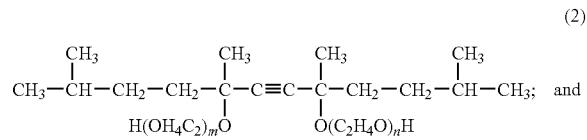

(2)

(B-2) at least one member selected from polyoxy(ethylene-propylene) block polymers represented by the following formula (3):

$$O(C_2H_4O)_w(C_3H_6O)_x(C_2H_4O)_y(C_3H_6O)_zH \quad (3).$$

26 Claims, No Drawings

PROTECTIVE COATING CONTAINING ACETYLENE COMPOUND

CROSS-REFERENCE TO RELATED APPLICATION

This non-provisional application claims priority under 35 U.S.C. §119(a) on Patent Application No. 2006-243783 filed in Japan on Sep. 8, 2006, the entire contents of which are hereby incorporated by reference.

TECHNICAL FIELD

This invention relates to a protective coating containing an acetylene compound, and more specifically, to a protective coating which is effective for use in the applications such as building materials, building exterior materials, and automobiles, and which exhibits excellent adhesion and water resistance when used as a building material or a building exterior material, and excellent rust preventive properties when used for an automobile.

BACKGROUND ART

A protective coating is required to have various different properties depending on the intended application of the coating. For example, a protective coating used as a building material or building exterior material is required to exhibit good adhesion and corrosion resistance, and in some cases, a high heat resistance and capability of adhering to other substrates, and a protective coating used for an automobile should also have rust preventive properties.

The building material industry is currently experiencing a switchover from protective materials using an organic solvent to those using water in view of reducing the use of volatile organic compounds (VOC).

A protective coating formed by using a water-borne resin, however, had the problem of inferior initial water resistance compared to the protective material prepared by using an organic solvent. Accordingly, such protective coating often suffered from peeling and other problems when the protective coating experienced a high humidity condition, for example, a rainfall immediately after the coating. In view of such situation, an attempt has recently made to improve the water resistance of the water-borne protective coating by reacting acidic functional group of the anionic water-borne resin with an oxylane group-containing compound to thereby leave no hydrophilic group. This protective coating was still insufficient in its initial water resistance immediately after the coating.

U.S. Pat. No. 3,464,946 (Patent Document 1) and U.S. Pat. No. 3,444,114 (Patent Document 2) disclose an alkyl etherified amino resin which has been converted by reaction with an oxycarboxylic acid to enable its use in water-borne composition. These attempts, however, failed to solve the problem of the water resistance.

JP-B 8-32851 (Patent Document 3) discloses a two part-type water-borne coating composition which is cured with isocyanate. This composition is still insufficient in the water resistance.

Accordingly, there is a need for development of a protective coating which exhibits improved properties such as water resistance and adhesion.

In the meanwhile, a coating composition used for automobiles should have rust preventive properties. In this regard, lead salt pigments such as minium, lead cyanamide, and calcium metaplumbate, and metal chromate pigments such as basic zinc chromate and strontium chromate had once been the main reagent used for the coating composition. Use of such reagent, however, was gradually restricted in consideration of the health hazard and environmental conservation. Since then, non-polluting, non-toxic rust preventive pigments have been developed. Exemplary such rust preventive pigments include metal phosphates such as zinc phosphate, calcium magnesium phosphate, titanium phosphate, and silica phosphate; condensed metal phosphates such as aluminum tripolyphosphate; metal phosphorite such as zinc phosphorite, calcium phosphorite, strontium phosphorite, and aluminum phosphorite; zinc molybdate, calcium molybdate, barium borate, and zinc borate. These non-polluting, non-toxic pigments used in the coating composition, however, failed to exhibit rust preventive performance comparable to that of the lead salt pigments and chromate pigments, and the coating composition was equivalent to the prior art coating compositions in its use of the rust preventive pigment.

JP-A 5-140491 (Patent Document 4) discloses a water-borne etch-resistant coating composition for a metal plate produced by adding a surfactant and an acetylene alcohol compound and/or an acetylene glycol compound. In this coating composition, the uniform distribution of the resin component on the metal surface is enabled by the use of the surfactant and the acetylene alcohol compound and/or the acetylene glycol compound, and it is the resin that realizes the etch-resistance.

JP-A 2000-104015 (Patent Document 5) discloses a thermosetting coating composition comprising a water-borne polyurethane resin having the thermosetting property. Use of the urethane resin, however, is associated with the drawback of insufficient light resistance and high cost.

DISCLOSURE OF THE INVENTION

The present invention has been completed in view of the situation as described above, and an object of the present invention is to provide a protective coating which is adapted for use in applications such as building materials, building exterior materials, and automobiles, and which exhibits excellent adhesion and water resistance when used as a building material or building exterior material, and excellent rust preventive performance when used for an automobile.

The inventors of the present invention made an intensive study to realize the objects as described above, and found that the protective coating prepared by blending the synthetic resin as described below which constitutes the base of the coating composition with a mixture of an acetylene glycol surfactant, a polyoxy(ethylene-propylene) block copolymer having a weight average molecular weight of a particular range exhibits an excellent adhesion to various types of underlying substrates and protective performance including water resistance and rust preventive properties, and such protective coating capable of solving the prior art problems as described above is particularly useful as a protective coating for use in the applications including building materials, building exterior materials, and automobiles. The present invention has been completed on the basis of such finding.

Accordingly, the present invention provides a protective coating containing an acetylene compound as described below.

(1) A protective coating comprising 100 parts by weight of a synthetic resin solid content (A); and 0.01 to 10 parts by weight of a mixture of (B-1) 10 to 95% by weight of acetylene glycol represented by the following general formula (1):

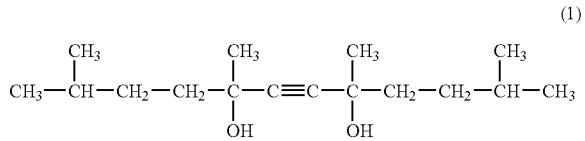

and/or an ethoxylated derivative of the acetylene glycol represented by the following general formula (2):

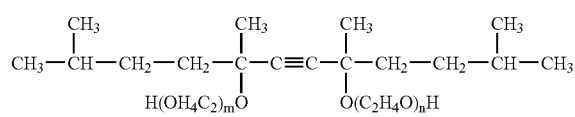

wherein m and n are respectively a positive number, and m+n is 2 to 30;

(B-2) 5 to 90% by weight of at least one member selected from polyoxy(ethylene-propylene) block polymers represented by the following formula (3):

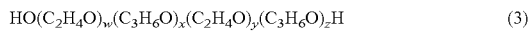

wherein w, x, y, and z are respectively 0 or a positive number with the proviso that w+x+y+z>0, the block polymer having a weight average molecular weight of 1,500 to 10,000, an ethylene oxide content of 35 to 90% by weight, and a propylene oxide content of 10 to 65% by weight; and (B-3) 0 to 25% by weight of at least one member selected from water, a water soluble organic solvent, and an acetylene glycol or ethoxylated derivative thereof other than those of the formulae (1) and (2).

(2) A protective coating according to the above (1) further comprising
1 to 200 parts by weight of a filler (C).

(3) A protective coating according to the above (1) or (2) wherein the component (A) is at least one member selected from (meth)acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and aqueous epoxy resin.

(4) A protective coating according to any one of the above (1) to (3) wherein the component (B-1) has a sodium content of up to 1,000 ppm.

(5) A protective coating according to any one of the above (1) to (4) wherein the coating has a thickness of 1 to 100 μm.

(6) A protective coating according to any one of the above (1) to (5) wherein the protective coating is used for a building material, a building exterior material, an automobile, or a glass fiber treatment.

EFFECTS OF THE INVENTION

The present invention is capable of providing a protective coating which exhibits excellent corrosion resistance and adhesion when applied on a building material or a building exterior material, and which exhibits excellent rust preventive properties when applied on an automobile.

The protective coating of the present invention exhibits excellent adhesion with no swelling or the like even if an oily substance such as an oil film were present on the surface of the material.

DESCRIPTION OF THE PREFERRED EMBODIMENTS

The protective coating of the present invention comprises
100 parts by weight of a synthetic resin solid content (A); and
0.01 to 10 parts by weight of a mixture of
(B-1) 10 to 95% by weight of acetylene glycol represented by the following general formula (1):

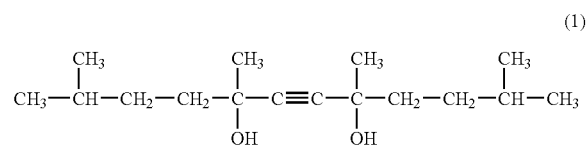

and/or an ethoxylated derivative of the acetylene glycol represented by the following general formula (2):

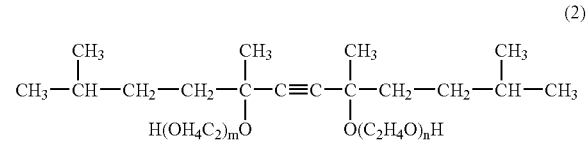

wherein m and n are respectively a positive number, and m+n is 2 to 30;

(B-2) 5 to 90% by weight of at least one member selected from polyoxy(ethylene-propylene) block polymers represented by the following formula (3):

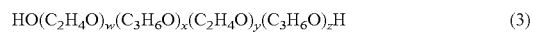

wherein w, x, y, and z are respectively 0 or a positive number with the proviso that w+x+y+z>0, the block polymer having a weight average molecular weight of 1,500 to 10,000, an ethylene oxide content of 35 to 90% by weight, and a propylene oxide content of 10 to 65% by weight; and (B-3) 0 to 25% by weight of at least one member selected from water, a water soluble organic solvent, and an acetylene glycol or ethoxylated derivative thereof other than those of the formulae (1) and (2).

The main component constituting the coating composition for forming the protective coating of the present invention is the component (A), and this component (A) is preferably at least one member selected from (meth)acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and water soluble epoxy resin. Among these, the preferred in view of versatility and cost are (meth)acrylate resin emulsion, styrene-acrylate copolymer emulsion, vinyl acetate resin emulsion, and vinyl acetate-(meth)acrylate copolymer emulsion. The resin may be either the one produced by emulsion polymerization using a known polymerization method or a commercially available product. The emulsion used for the component (A) preferably has a solid content of 20 to 60% by weight, and more preferably, a solid content of 30 to 50% by weight.

The monomer containing an unsaturated group used for the component (A), and in particular, (meth)acrylate resin emulsion, styrene/acrylate copolymer emulsion, vinyl acetate resin emulsion, and vinyl acetate/(meth)acrylate copolymer emulsion is not particularly limited, and exemplary monomers include ethylene, propylene; vinyl carboxylate monomers such as vinyl acetate and vinyl propionate; aromatic vinyl monomers such as styrene and α-methylstyrene; conjugated diene monomers such as 1,3-butadiene and 2-methyl-1,3-butadiene; ethylenically unsaturated monocarboxylate esters such as methyl acrylate, ethyl acrylate, butyl acrylate, 2-ethylhexyl acrylate, and methyl methacrylate; ethylenically unsaturated dicarboxylate esters such as dimethyl itaconate, diethyl maleate, monobutyl maleate, monoethyl fumarate, and dibutyl fumarate; ethylenically unsaturated monocarboxylic acids such as acrylic acid, methacrylic acid, and crotonic acid; ethylenically unsaturated dicarboxylic acids such as itaconic acid, maleic acid, and fumaric acid; epoxy group-containing monomers such as glycidyl methacrylate; alcohol group-containing monomers such as 2-hydroxyethyl methacrylate; alkoxyl group-containing monomers such as methoxyethyl acrylate; nitrile group-containing monomers such as acrylonitrile; amide group-containing monomer such as acrylamide; amino group-containing monomer such as dimethylaminoethyl methacrylate; and a monomer containing two or more ethylenically unsaturated groups such as divinylbenzene and allylmethacrylate. The emulsion polymerization may be conducted by using such monomers.

The emulsion polymerization may be accomplished by any emulsion polymerization method known in the art. The unsaturated group-containing monomer and other polymerization aids (such as an emulsifying agent such as alkyl sulfate ester salt, a polymerization initiator such as ammonium sulfate, a pH adjusting agent such as sodium carbonate, and various antifoaming agents) may be added at once at the initial stage of the reaction; continuously in the course of the reaction; or intermittently or in divided dose during the polymerization.

The emulsifying agent used in such emulsion polymerization include the surfactants as described in the following (1) to (4), and such surfactant may be used either alone or in combination of two or more.

(1) Anionic Surfactant

Surfactants such as alkyl sulfate ester salt, polyoxyethylene alkyl ether sulfate ester salt, alkyl benzene sulfonate, alkyl diphenyl ether disulfonate, alkyl naphthalene sulfonate, fatty acid salt, dialkyl sulfosuccinates salt, alkyl phosphate ester salt, and polyoxyethylene alkylphenyl phosphate ester salt.

(2) Nonionic Surfactant

Surfactant such as polyoxyethylene alkylphenyl ether, polyoxyethylene alkyl ether, polyoxyethylene fatty ester, sorbitan fatty acid ester, polyoxyethylene sorbitan fatty acid ester, polyoxyalkylene alkyl ether, polyoxyethylene derivative, glycerin fatty acid ester, polyoxyethylene hydrogenated castor oil, polyoxyethylene alkylamine, alkyl alkanol amide, or acetylene alcohol, acetylene glycol, and their ethylene oxide adduct.

(3) Cationic Surfactant

Surfactant such as alkyltrimethyl ammonium chloride, dialkyl dimethyl ammonium chloride, alkyl benzyl ammonium chloride, and alkylamine salt.

(4) Polymerizable surfactant having a radically polymerizable double bond in its molecule, for example, alkylallyl sulfosuccinate salt, methacryloyl polyoxyalkylene sulfate salt, and polyoxyethylene nonylpropenylphenyl ether sulfate salt.

Such surfactant may be used at an amount of 0.3 to 20 parts by weight, and preferably at 0.5 to 10 parts by weight in relation to the unsaturated group-containing monomer.

The polymerization initiator used in such emulsion polymerization include persulfates such as ammonium persulfate and potassium persulfate; azo compounds such as 2,2'-diamidino-2,2'-azopropane dihydrochloride and azobisisobutyronitrile; and peroxides such as cumene hydroperoxide, benzoyl peroxide, and hydrogen peroxide. The polymerization initiator used may also be a known redox initiator, for example, potassium persulfuric and sodium hydrogen sulfite. Such polymerization initiator may be used at an amount of 0.1 to 5 parts by weight, and preferably at 0.2 to 2 parts by weight in relation to the unsaturated group-containing monomer.

The temperature used for the emulsion polymerization is generally 10 to 90° C., and preferably 50 to 80° C. The time used for the polymerization is 3 to 20 hours. The polymerization is preferably conducted in an inert atmosphere such as nitrogen gas.

As described above, of the mixture incorporated in the protective coating of the present invention, the component (B-1) is at least one acetylene glycol or its derivative selected from 2,5,8,11-tetramethyl-6-dodecyne-5,8-diol represented by the following general formula (1) and an ethylene oxide derivative of 2,5,8,11-tetramethyl-6-dodecyne-5,8-diol represented by the following general formula (2):

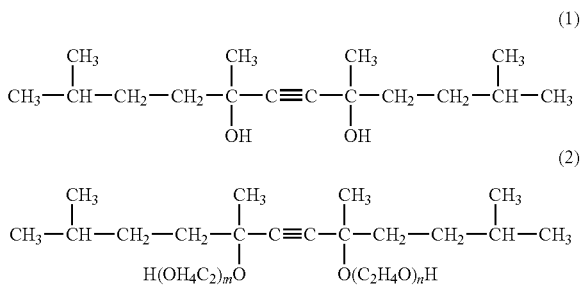

wherein m and n are respectively a positive number, and m+n is 2 to 30, and preferably 4 to 12.

Total molar number of the ethylene oxide added in the ethoxylated derivative represented by the formula (2) is 2 to 30 moles, and preferably 4 to 12 moles. When the molar number of the ethylene oxide added exceeds 30 moles, the coating composition formed may be repelled in the course of coating.

The component (B-1) may preferably have a sodium content of up to 1,000 ppm (0 to 1,000 ppm), and in addition, a potassium content of up to 2,000 ppm (0 to 2,000 ppm). More preferably, the component (B-1) may have a sodium content of 100 to 800 ppm. Use of the component (B-1) with the sodium content less than such amount will prevent loss of rust preventive properties and water resistance. The sodium content and the potassium content may be controlled to such range, for example, by purification of the acetylene glycol, use of highly purified starting materials, and synthesis of the acetylene glycol in a production environment that will prevent contamination of the metal.

The component (B-1) included in the mixture has triple bond in its molecule, and this triple bond is postulated to realize formation of a dense coating, and accordingly, the excellent adhesion and rust preventive properties of the coating. The component (B-1) also has a hydrophobic group in its structure, and the composition is less likely to entrain water, and accordingly, the coating exhibits excellent water resistance.

The acetylene glycol or its adduct [component (B-1)] as described above may be used alone or in combination of two or more, and in preparing the blend used for the protective material of the present invention, the component (B-1) may be used at an amount of 10 to 95% by weight, preferably at 30 to 80% by weight, and more preferably at 40 to 70% by weight in relation to the total of the components (B-1) and (B-2) and the component (B-3) as described below. When used at an amount of less than 10% by weight, bubbling may occur in the formation of the protective coating and this may invite defects such as increase in the number of pin holes formed in the resulting coating. When this amount exceeds 95% by weight, solubility in water may become insufficient.

The polyoxy(ethylene-propylene) block copolymer of the component (B-2) blended with the acetylene glycol or its derivative of the component (B-1) may be the polyoxyalkylene alkyl ether represented by the following formula (3):

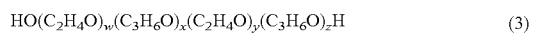

(wherein w, x, y, and z are 0 or a positive number with the proviso that w+x+y+z is greater than 0), and examples include:

$HO(C_2H_4O)_w(C_3H_6O)_{20}(C_2H_4O)_yH$ (wherein w+y=27), $HO(C_2H_4O)_w(C_3H_6O)_{30}(C_2H_{46})_yH$ (wherein w+y=160), $HO(C_2H_4O)_w(C_3H_6O)_{35}(C_2H_4O)_yH$ (wherein w+y=30), $HO(C_2H_4O)_w(C_3H_6O)_{35}(C_2H_4O)_yH$ (wherein w+y=48), $HO(C_2H_4O)_w(C_3H_6O)_{20}(C_2H_4O)_yH$ (wherein w+y=155), and $HO(C_3H_6O)_x(C_2H_4O)_{155}(C_3H_6O)_z$ (wherein x+z=30), which may be used alone or in combination of two or more.

The component (B-2) has a weight average molecular weight calculated in terms of polystyrene as measured by gel permeation chromatography (GPC) of 1,500 to 10,000, and preferably 3,000 to 9,000. When the molecular weight is less than 1,500, solubility in water may become insufficient when used in preparing an aqueous coating composition. The molecular weight in excess of 10,000 may invite inconsistency of the coating formed by the resulting coating composition.

The ethylene oxide content is 35 to 90% by weight, preferably 35 to 85% by weight, and more preferably 40 to 70% by weight. The content of less than 35% by weight may invite loss of miscibility in the resin component while the content in excess of 90% by weight may result in the repellency of the resulting coating composition when it is applied on a metal.

The propylene oxide is 10 to 65% by weight, preferably 15 to 65% by weight, and more preferably 30 to 60% by weight.

Amount of the component (B-2) used in preparing the surfactant composition of the present invention is 5 to 90% by weight, preferably 20 to 70% by weight, and more preferably 30 to 60% by weight of the total amount of the components (B-1) and (B-2) and the component (B-3) as described below. When the content of the component (B-2) is less than 5% by weight, solubilization of the component (B-1) may be insufficient. On the other hand, content in excess of 90% by weight may result in foaming, and this may invite increase in the number of pin holes formed in the resulting coating.

In present invention, the component (B-1) and the component (B-2) are preferably used so that the total of the components (B-1) and (B-2) constitutes 100% by weight. However, the coating composition of the present invention may also include pure water; a water soluble organic solvent such as ethyleneglycol, diethylene glycol, triethylene glycol, tetraethylene glycol, polyethylene glycol, propylene glycol, dipropylene glycol, 1,3-propanediol, 1,4-butanediol, or glycerin; or an acetylene glycol or an ethoxylated derivative thereof other than those of the formulae (1) or (2) such as 5,8-dimethyl-6-dodecyne-5,8-diol, 2,4,7,9-tetramethyl-5-decyne-4,7-diol, ethoxylated 2,4,7,9-tetramethyl-5-decyne-4,7-diol (molar number of the ethylene oxide added: 4), 2,4,7,9-tetramethyl-5-decyne-4,7-diol (molar number of the ethylene oxide added: 10), ethoxylated 2,4,7,9-tetramethyl-5-decyne-4,7-diol (molar number of the ethylene oxide added: 30), 4,7-dimethyl-5-decyne-4,7-diol, 8-hexadecyne-7,10-diol, 7-tetradecyne-6,9-diol, 2,3,6,7-tetramethyl-4-octyne-3,6-diol, 3,6-diethyl-4-octyne-3,6-diol, 3,6-dimethyl-4-octyne-3,6-diol, or 2,5-dimethyl-3-hexyne-2,5-diol as the component (B-3). This component (B-3) may be used to constitute 0 to 25% by weight, and preferably 5 to 20% by weight as long as such inclusion does not adversely affect the properties of the coating composition for forming the protective coating of the present invention.

As described above, the mixture of the components (B-1), (B-2), and (B-3) may be incorporated at 0.01 to 10 parts by weight, preferably at 0.1 to 5 parts by weight, and more preferably at 0.2 to 2 parts by weight in relation to 100 parts by weight of the solid content of the component (A). Incorporation of the mixture at an excessively low content may invite a coating failure, for example, by the repelling of the coating composition. On the other hand, incorporation of the mixture at an excessive amount may also invite coating failure due to increase in the bubbling.

The filler which is component (C) in the coating composition of the present invention is preferably at least one member selected from titanium, talc, kaolin, bentonite, mica, silica, heavy calcium carbonate, clay, precipitated barium sulfate, barium carbonate, glass beads, and resin beads.

The component (C) is used at an amount of 0 to 200 parts by weight and particularly at 1 to 200 parts by weight, and preferably at 5 to 150 parts by weight, and most preferably at 10 to 100 parts by weight in relation to 100 parts by weight of the solid content of the component (A). When the amount of component (C) is excessively low, the time required for drying of the coating will be unduly long, while an excessively high content of the component (C) may results in poor elongation rate of the coating, and the resulting coating may have a reduced strength.

The coating composition for providing the protective coating of the present invention is produced by mixing the components as described above, for example, by a mixing method known in the art using a propeller blender. If desired, the component which is solid at room temperature may be added after heating.

The coating composition of the present invention may have additives incorporated therein to the extent that does not adversely affect the performance of the coating composition. Exemplary such additives include humectant, dispersant, antifoaming agent, coating aid, freeze stabilizer, leveling agent, surfactant, light stabilizer, and antiseptic.

The resulting composition is coated on a metal such as iron, aluminum, copper, and SUS, an alloy, or a ceramic, to a thickness of 1 to 100 μm, and preferably 2 to 50 μm by a roll coater, a brush, a slit die coater, a knife coater, a spray coater, a curtain coater, or the like, with optionally dried at an elevated temperature to thereby produce the protective coating. The surface of the material to which the composition is applied may be preliminarily treated by plating or blasting. The drying is preferably conducted at a temperature of 105 to 160° C. The protective coating of the present invention is particularly adapted for use as a building material, building exterior material, an automobile, and a material treated with a glass fiber.

EXAMPLES

Next, the present invention is described in further detail by referring to the Examples and Comparative Examples which by no means limit the scope of the present invention. The parts and % in the Examples indicate parts by weight and % by weight, respectively.

Examples and Comparative Examples

Amount of the components (B-1), (B-2), and (B-3) blended in the coating composition are shown in Table 1.

<Mix of (B-1) and (B-2)>

Component (B-1)

B-1-1: 2,5,8,11-tetramethyl-6-decyne-5,8-diol represented by the following formula (1):

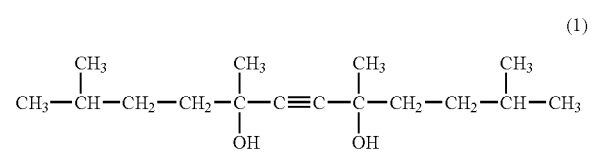

B-1-2: ethoxylated 2,5,8,11-tetramethyl-6-decyne-5,8-diol (molar number of the ethylene oxide added: m+n=6) represented by the following formula (2):

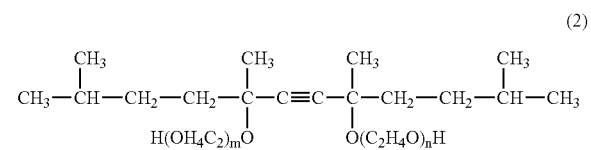

B-1-3: ethoxylated 2,5,8,11-tetramethyl-6-decyne-5,8-diol (molar number of the ethylene oxide added: m+n=50) represented by the formula (2), B-1-2': a compound having a composition the same as that of the B-1-2.

Component (B-2)

B-2-1: Epan 750 (product name of $HO(C_2H_4O)_w(C_3H_6O)_{35}(C_2H_4O)_yH$ wherein w+y=48; manufactured by Dai-ichi Kogyo Seiyaku Co., Ltd.; weight average molecular weight, 4,000; ethylene oxide content, 51%; propylene oxide content, 49%), B-2-2: Epan 680 (product name of $HO(C_2H_4O)_w(C_3H_6O)_{30}(C_2H_4O)_yH$ wherein w+y=160; manufactured by Dai-ichi Kogyo Seiyaku Co., Ltd.; weight average molecular weight, 8,800; ethylene oxide content, 80%; propylene oxide content, 20%),

TABLE 1

| Amount | Example | | | | | | Comparative Example | | | | |
|---|---|---|---|---|---|---|---|---|---|---|---|
| (% by weight) | M-1 | M-2 | M-3 | M-4 | M-5 | M-6 | M-7 | M-8 | M-9 | M-10 | M-11 |
| Component (B-1) | | | | | | | | | | | |
| Na content (ppm) | 500 | 700 | 500 | 700 | 500 | 1,200 | 800 | 500 | 500 | 500 | 700 |
| B-1-1 | 40 | | 65 | | 55 | | | 60 | 20 | 5 | |
| B-1-2 | | 30 | | 30 | | | | | | | 97 |
| B-1-3 | | | | | | | 40 | | | | |
| B-1-2' | | | | | | 30 | | | | | |
| Component (B-2) | | | | | | | | | | | |
| B-2-1 | 60 | | | | | 70 | | | | | |
| B-2-2 | | 50 | | | 35 | | | | | 95 | 3 |
| B-2-3 | | | 25 | | | | 60 | | | | |
| B-2-4 | | | | 60 | | | | | | | |
| B-2-5 | | | | | 40 | | | | | | |
| B-2-6 | | | | | | | | 70 | | | |
| Component (B-3) | | | | | | | | | | | |
| EG | | | 5 | | | | | | | | |
| PG | | 20 | 5 | | | | | | | | |
| Pure water | | | | | | | | | 10 | | |
| B-3-1 | | | | 10 | | | | | | | |
| B-3-2 | | | | | 10 | | | | | | |

B-2-3: Epan 485 (product name of $HO(C_2H_4O)_w(C_3H_6O)_{20}(C_2H_4O)_yH$ wherein w+y=155; manufactured by Dai-ichi Kogyo Seiyaku Co., Ltd.; weight average molecular weight, 8,000; ethylene oxide content, 85%; propylene oxide content, 15%), B-2-4: Pluronic 25R8 (product name of $HO(C_3H_6O)_x(C_2H_4O)_{155}(C_3H_6O)_zH$ wherein x+z=30; manufactured by BASF; weight average molecular weight, 8,550; ethylene oxide content, 80%; propylene oxide content, 20%), B-2-5: Epan 410 (product name of $HO(C_2H_4O)_w(C_3H_6O)_2O(C_2H_4O)_yH$ wherein w+y=2; manufactured by Dai-ichi Kogyo Seiyaku Co., Ltd.; weight average molecular weight, 1,330; ethylene oxide content, 7%; propylene oxide content, 92%), B-2-6: Epan 785 (product name of $HO(C_2H_4O)_w(C_3H_6O)_{35}(C_2H_4O)_yH$ wherein w+y=250; manufactured by Dai-ichi Kogyo Seiyaku Co., Ltd.; weight average molecular weight, 13,000; ethylene oxide content, 84%; propylene oxide content, 16%).

Component (B-3)
EG: ethyleneglycol,
PG: propylene glycol,
B-3-1: Surfynol 104 (product name of 2,4,7,9-tetramethyl-5-decyne-4,7-diol manufactured by Air Products),
B-3-2: Surfynol 440 (product name of ethoxylated derivative of 2,4,7,9-tetramethyl-5-decyne-4,7-diol, molar number of the ethylene oxide added: 3.5 moles, manufactured by Air Products).

Na was quantitatively determined by ICP emission spectrophotometer (IRIS Intorepid II XSP).

[Preparation of the Coating Composition for Protective Coating]

50 parts of Vinyblan 2583 (product name of an acryl emulsion manufactured by Nissin Chemical Industry Co., Ltd., solid content, 45%), 30 parts of the filler paste as described below, 15 parts of ion exchanged water, 4 parts of 5% aqueous solution of adipic acid dihydrazide, and 1 part of the mix (M-1 to M-11) were mixed to produce the protective coating for evaluation.

[Preparation of Filler Paste]

70 parts of titanium dioxide (Typaque R-780 manufactured by Ishihara Sangyo Kaisha Ltd.), 0.5 parts of antifoaming agent (Surfynol DF-58 manufactured by Air Products), 5 parts of pigment dispersant (Dispersant BYK-190 manufactured by BYK-Chemie GmbH), and 24.5 parts of ion exchanged water were mixed, and dispersed with Disper to produce the pigment paste.

[Preparation of the Sample Coated with the Coating Composition]

The coating composition was applied on a zinc plated steel plate to a dry thickness of 10 μm, and then dried at 110° C. for 10 minutes to thereby produce a test plate for evaluation. This steel strip was designated Sample plate No. 1.

Among building exterior materials such as cement siding materials, aluminum siding materials, and iron siding materials, an aluminum siding material was selected for the evaluation in consideration of the use for a building exterior material. The coating composition was coated to a thickness (dry thickness) of 30 μm, and the coating was dried at 110° C. for 10 minutes to thereby form the protective coating. This steel strip was designated Sample plate No. 2.

[Evaluation of the Performance of the Composition and the Protective Coating]

Viscosity

The viscosity was measured by using a paddle viscometer (23° C.).

pH

The pH was measured according to JIS Z 8802 by using the sample with no further treatment.

Rust Preventive Properties

The rust preventive properties were evaluated by salt spray test of the test plate according to JIS K 5600.

After the test, rust generation, adhesion, and appearance of the coating were evaluated by the following criteria:

⊚: No rust observed at the cut. Adhesion of 100/100.
○: Red rust at the cut of up to 5%.
Δ: Red rust at the cut of 6 to 20%.
X: Red rust at the cut in excess of 20%.

Adhesion

The adhesion was evaluated by crosscut test according to JIS K 5600.

The coating was observed after applying and peeling an adhesive tape, and the percentage of the non-peeled area is shown in the Table.

Water Resistance

The water resistance was evaluated by immersing the test plate which is the same as the one used for evaluating the adhesion in a warm water of 50° C. for 10 days, and evaluating outer appearance of the coating (discoloration, swelling, peeling, etc.) and adhesion.

⊚: No change in the outer appearance of the coating, with the adhesion of 100/100.
○: Swelling at the cuts with the adhesion of 80/100 or higher.
Δ: Swelling at the cuts with the adhesion of 50/100 or higher.
X: Swelling at the cuts with the adhesion of less than 50/100.

The results are shown in Table 2.

TABLE 2

| Sample plate | | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| 1 | Blend | M-1 | M-2 | M-3 | M-4 | M-5 | M-6 | M-7 | M-8 | M-9 | M-10 | M-11 |
| | Viscosity (KV) | 70 | 70 | 70 | 70 | 70 | 72 | 72 | 72 | 72 | 72 | 72 |
| | pH | 9 | 9 | 9 | 9 | 9 | 9 | 9 | 9 | 9 | 9 | 9 |
| | Rust preventive properties | ⊚ | ⊚ | ⊚ | ⊚ | ⊚ | ○ | X | X | X | Δ | X |
| | Water resistance | ⊚ | ○ | ○ | ⊚ | ⊚ | Δ | X | Δ | X | Δ | X |
| | Adhesion | 100 | 100 | 80 | 100 | 100 | 40 | 40 | 60 | 20 | 40 | 20 |

TABLE 2-continued

| Sample plate | | Example | | | | | | Comparative Example | | | | |
|---|---|---|---|---|---|---|---|---|---|---|---|---|
| | | 1 | 2 | 3 | 4 | 5 | 6 | 1 | 2 | 3 | 4 | 5 |
| 2 | Blend | M-1 | M-2 | M-3 | M-4 | M-5 | M-6 | M-7 | M-8 | M-9 | M-10 | M-11 |
| | Viscosity (KV) | 70 | 70 | 70 | 70 | 70 | 72 | 72 | 72 | 72 | 72 | 72 |
| | pH | 9 | 9 | 9 | 9 | 9 | 9 | 9 | 9 | 9 | 9 | 9 |
| | Rust preventive properties | ⊚ | ⊚ | ⊚ | ⊚ | ⊚ | ⊚ | Δ | Δ | X | Δ | Δ |
| | Water resistance | ⊚ | ○ | ○ | ⊚ | ⊚ | ⊚ | Δ | Δ | Δ | X | X |
| | Adhesion | 100 | 100 | 100 | 100 | 100 | 40 | 40 | 40 | 20 | 40 | 20 |

Japanese Patent Application No. 2006-243783 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A coated material comprising:
a substrate selected from the group consisting of a building material, a building exterior material, an automobile and a glass fiber, and
a protective coating formed by drying a composition on the surface of the substrate, the composition comprising:
(A) 100 parts by weight of a synthetic resin solid content;
(B) 0.01 to 10 parts by weight of a mixture of
(B-1) 10 to 93% by weight of acetylene glycol represented by the following general formula (1):

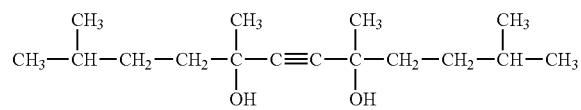

(1)

and/or an ethoxylated derivative of the acetylene glycol represented by the following general formula (2):

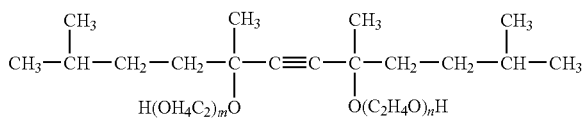

(2)

wherein m and n are respectively a positive number, and m+n is 2 to 30;
(B-2) 5 to 90% by weight of at least one member selected from polyoxy(ethylene-propylene) block polymers represented by the following formula (3):

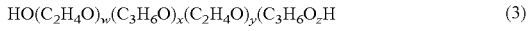

HO(C$_2$H$_4$O)$_w$(C$_3$H$_6$O)$_x$(C$_2$H$_4$O)$_y$(C$_3$H$_6$O)$_z$H    (3)

wherein w, x, y, and z are respectively 0 or a positive number with the proviso that w+x+y+z>0, the block polymer having a weight average molecular weight of 1,500 to 10,000, an ethylene oxide content of 35 to 90% by weight, and a propylene oxide content of 10 to 65% by weight; and (B-3) 0 to 25% by weight of at least one member selected from water, a water soluble organic solvent, and an acetylene glycol or ethoxylated derivative thereof other than those of the formulae (1) and (2), and
(C) 1 to 200 parts by weight of a filler.

2. The coated material according to 1, wherein the at least one filler is selected from the group consisting of titanium oxide, talc, kaolin, bentonite, mica, silica, heavy calcium carbonate, clay, precipitated barium sulfate, barium carbonate, glass beads, and resin beads.

3. The coated material according to claim 1, wherein the component (A) is at least one member selected from (meth)acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and aqueous epoxy resin.

4. The coated material according to claim 1, wherein the component (B-1) has a sodium content of up to 1,000 ppm.

5. The coated material according to claim 1, wherein the coating has a thickness of 1 to 100 μm.

6. The coated material according to claim 4, wherein the component (B-1) has a sodium content of 100 ppm-800 ppm.

7. The coated material according to claim 1, wherein the protective coating is applied on a metal selected from iron, aluminum, copper, SUS metal, alloy and ceramic.

8. A coated material comprising:
a substrate selected from the group consisting of a building material, a building exterior material, an automobile and a glass fiber, and
a protective coating formed by applying onto the substrate and then drying a composition on the surface thereof at 105° C. to 160° C., the composition consisting essentially of:
(A) 100 parts by weight of a synthetic resin solid content; and
(B) 0.01 to 10 parts by weight of a mixture of
(B-1) 10 to 95% by weight of acetylene glycol represented by the following general formula (1):

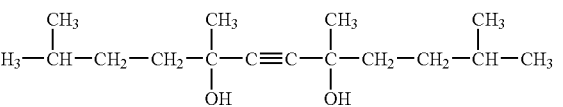

(1)

and/or an ethoxylated derivative of the acetylene glycol represented by the following general formula (2):

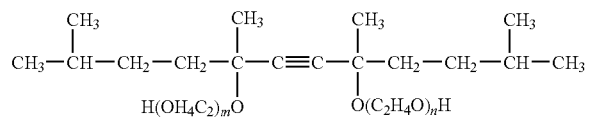

(2)

wherein m and n are respectively a positive number, and m+n is 2 to 30;

(B-2) 5 to 90% by weight of at least one member selected from polyoxy(ethylene-propylene) block polymers represented by the following formula (3):

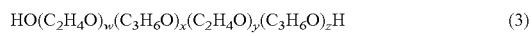

(3)

wherein w, x, y, and z are respectively 0 or a positive number with the proviso that w+x+y+z>0, the block polymer having a weight average molecular weight of 1,500 to 10,000, an ethylene oxide content of 35 to 90% by weight, and a propylene oxide content of 10 to 65% by weight; and (B-3) 0 to 25% by weight of at least one member selected from water, a water soluble organic solvent, and an acetylene glycol or ethoxylated derivative thereof other than those of the formulae (1) and (2), (C) 1 to 200 parts by weight of at least one filler, and (D) optionally at least one additive selected from humectant, dispersant, antifoaming agent, coating aid, freeze stabilizer, leveling agent, surfactant, light stabilizer, and antiseptic agent.

9. The coated material according to claim 8, wherein the at least one filler is selected from the group consisting of titanium oxide, talc, kaolin, bentonite, mica, silica, heavy calcium carbonate, clay, precipitated barium sulfate, barium carbonate, glass beads, and resin beads.

10. The coated material according to claim 8, wherein the component (A) is at least one member selected from (meth) acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and aqueous epoxy resin.

11. The coated material according to claim 8, wherein the component (B-1) has a sodium content of up to 1,000 ppm.

12. The coated material according to claim 8, wherein the coating has a thickness of 1 to 100 μm.

13. The coated material according to claim 11, wherein the component (B-1) has a sodium content of 100 ppm-800 ppm.

14. The coated material according to claim 8, wherein the protective coating is applied on a metal selected from iron, aluminum, copper, SUS metal, alloy and ceramic.

15. The coated material according to claim 8, wherein said composition consists of:

(A) 100 parts by weight of a synthetic resin solid content; and (B) 0.01 to 10 parts by weight of a mixture of (B-1) 10 to 95% by weight of acetylene glycol represented by the following general formula (1):

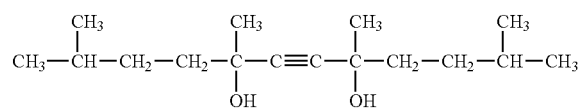

(1)

and/or an ethoxylated derivative of the acetylene glycol represented by the following general formula (2):

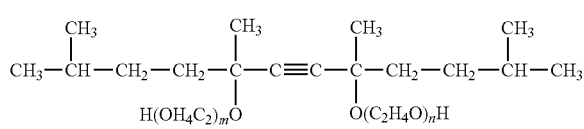

(2)

wherein m and n are respectively a positive number, and m+n is 2 to 30;

(B-2) 5 to 90% by weight of at least one member selected from polyoxy(ethylene-propylene) block polymers represented by the following formula (3):

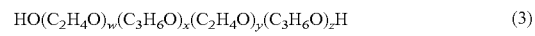

(3)

wherein w, x, y, and z are respectively 0 or a positive number with the proviso that w+x+y+z>0, the block polymer having a weight average molecular weight of 1,500 to 10,000, an ethylene oxide content of 35 to 90% by weight, and a propylene oxide content of 10 to 65% by weight; and (B-3) 0 to 25 by weight of at least one member selected from water, a water soluble organic solvent, and an acetylene glycol or ethoxylated derivative thereof other than those of the formulae (1) and (2), (C) 1 to 200 parts by weight of at least one filler, and (D) optionally at least one additive selected from humectant, dispersant, antifoaming agent, coating aid, freeze stabilizer, leveling agent, surfactant, light stabilizer, and antiseptic agent.

16. The coated material according to claim 15, wherein the at least one filler is selected from the group consisting of titanium oxide, talc, kaolin, bentonite, mica, silica, heavy calcium carbonate, clay, precipitated barium sulfate, barium carbonate, glass beads, and resin beads.

17. The coated material according to claim 1, wherein the component (B-1) has a potassium content of up to 2,000 ppm.

18. The coated material according to claim 1, wherein the component (C) is used at an amount of 10 to 100 parts by weight per 100 parts by weight of the solid content of component (A).

19. The coated material according to claim 8, wherein the component (C) is used at an amount of 10 to 100 parts by weight per 100 parts by weight of the solid content of component (A).

20. A method of forming a protective coating on the surface of a substrate selected from the group consisting of a building material, a building exterior material, an automobile and a glass fiber, the method comprising:

applying on the surface of the substrate a composition comprising:

(A) 100 parts by weight of a synthetic resin solid content;

(B) 0.01 to 10 parts by weight of a mixture of (B-1) 10 to 95% by weight of acetylene glycol represented by the following general formula (1):

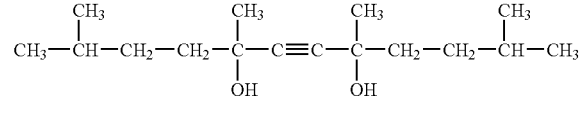

(1)

and/or an ethoxylated derivative of the acetylene glycol represented by the following general formula (2):

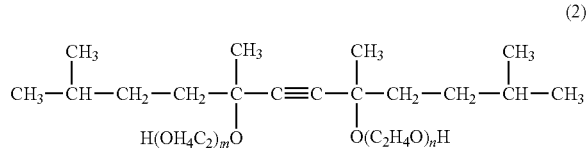 (2)

wherein m and n are respectively a positive number, and m+n is 2 to 30;

(B-2) 5 to 90% by weight of at least one member selected from polyoxy(ethylene-propylene) block polymers represented by the following formula (3):

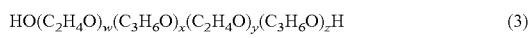 (3)

wherein w, x, y, and z are respectively 0 or a positive number with the proviso that w+x+y+z>0, the block polymer having a weight average molecular weight of 1,500 to 10,000, an ethylene oxide content of 35 to 90% by weight, and a propylene oxide content of 10 to 65% by weight; and (B-3) 0 to 25% by weight of at least one member selected from water, a water soluble organic solvent, and an acetylene glycol or ethoxylated derivative thereof other than those of the formulae (1) and (2), and (C) 1 to 200 parts by weight of a filler; and drying at a temperature of 105 to 160° C.

21. The method according to claim 20, wherein the at least one filler is selected from the group consisting of titanium oxide, talc, kaolin, bentonite, mica, silica, heavy calcium carbonate, clay, precipitated barium sulfate, barium carbonate, glass beads, and resin beads.

22. The method according to claim 20, wherein the component (A) is at least one member selected from (meth)acrylate resin emulsion, styrene-acrylate copolymer emulsion, vinyl acetate resin emulsion, vinyl acetate-(meth)acrylate copolymer emulsion, urethane resin emulsion, ethylene-vinyl acetate copolymer emulsion, polyester resin, and aqueous epoxy resin.

23. The method according to claim 20, wherein the component (B-1) has a sodium content of up to 1,000 ppm.

24. The method according to claim 20, wherein the coating has a thickness of 1 to 100 μm.

25. The method according to claim 20, wherein the component (B-1) has a sodium content of 100 ppm-800 ppm.

26. The method according to claim 20, wherein the protective coating is applied on a metal selected from iron, aluminum, copper, SUS metal, alloy and ceramic.

* * * * *